US010237104B2

(12) United States Patent
Yoon

(10) Patent No.: US 10,237,104 B2
(45) Date of Patent: *Mar. 19, 2019

(54) METHOD AND APPARATUS FOR TRANSMITTING AND RECEIVING REFERENCE SIGNAL IN WIRELESS COMMUNICATION SYSTEM

(71) Applicant: GOLDPEAK INNOVATIONS INC, Seoul (KR)

(72) Inventor: Sung Jun Yoon, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/729,604

(22) Filed: Oct. 10, 2017

(65) Prior Publication Data

US 2018/0048508 A1 Feb. 15, 2018

Related U.S. Application Data

(63) Continuation of application No. 14/703,360, filed on May 4, 2015, now Pat. No. 9,787,514, which is a (Continued)

(30) Foreign Application Priority Data

May 11, 2012 (KR) .................. 10-2012-0050406

(51) Int. Cl.
*H04W 76/04* (2009.01)
*H04W 24/08* (2009.01)
(Continued)

(52) U.S. Cl.
CPC ...... *H04L 27/2613* (2013.01); *H04J 13/0074* (2013.01); *H04L 5/0012* (2013.01); (Continued)

(58) Field of Classification Search
CPC . H04L 27/2613; H04L 5/0012; H04L 5/0035; H04L 5/0048; H04W 24/08; H04W 72/0413; H04W 76/046
(Continued)

(56) References Cited

U.S. PATENT DOCUMENTS 8,036,197 B2 * 10/2011 Pajukoski ............ H04B 1/7103
370/342
8,391,250 B2 * 3/2013 Park ........................ H04J 11/00
370/335
(Continued)

FOREIGN PATENT DOCUMENTS

CN 101771435 7/2010
CN 102142918 8/2011
(Continued)

OTHER PUBLICATIONS

3rd Generation Partnership Project; Technical Specification Group Radio Access Network; Evolved Universal Terrestrial Radio Access (E-UTRA); Physical Channels and Modulation. Dec. 2011, pp. 1-101. Valbonne, France.
(Continued)

*Primary Examiner* — Man U Phan

(57) ABSTRACT

The present invention relates to a method and an apparatus for transmitting and receiving a reference signal in a wireless communication system. In the method, in order to dynamically switch an uplink (UL) Demodulation-Reference Signal (DM-RS) according to the communication environment, such as CoMP and MU-MIMO, a parameter set for generation of a reference signal sequence is configured to include a Virtual Cell Identifier (VCID) parameter configured by information of a total of 9 bits and a cyclic shift hopping initial value parameter $c_{init}^{CSH}$, which is 9-bit information representing one integer value among 510 integer values. Therefore, it may be possible to achieve dynamic
(Continued)

transmission or reception of a reference signal and channel estimation through the dynamic transmission or reception of the reference signal even when the communication environment dynamically changes as in a Cooperative Multiple Point transmission and reception (CoMP) scenario.

18 Claims, 7 Drawing Sheets

Related U.S. Application Data continuation of application No. 13/891,522, filed on May 10, 2013, now Pat. No. 9,025,485.

(51) Int. Cl.
*H04L 27/26* (2006.01)
*H04W 72/04* (2009.01)
*H04L 5/00* (2006.01)
*H04J 13/00* (2011.01)
*H04W 76/27* (2018.01)

(52) U.S. Cl.
CPC .......... *H04L 5/0035* (2013.01); *H04L 5/0048* (2013.01); *H04L 5/0085* (2013.01); *H04W 24/08* (2013.01); *H04W 72/0413* (2013.01); *H04W 76/27* (2018.02); *H04W 72/0453* (2013.01)

(58) Field of Classification Search
USPC .................................. 370/280–329, 335–342
See application file for complete search history.

(56) References Cited

U.S. PATENT DOCUMENTS

| | | | |
|---|---|---|---|
| 8,731,124 B2* | 5/2014 | Sorrentino | H04L 27/2613 370/310 |
| 8,750,230 B2* | 6/2014 | Sorrentino | H04L 5/0091 370/310 |
| 8,804,647 B2 | 8/2014 | Ko et al. | |
| 8,842,622 B2 | 9/2014 | Zhang et al. | |
| 9,118,369 B2* | 8/2015 | Sorrentino | H04L 27/2613 |
| 9,253,005 B2* | 2/2016 | Sorrentino | H04L 27/2613 |
| 2012/0044796 A1 | 2/2012 | Yoon et al. | |
| 2012/0140717 A1 | 6/2012 | Zhu et al. | |
| 2013/0034064 A1* | 2/2013 | Nam | H04W 72/12 370/329 |
| 2013/0072241 A1* | 3/2013 | Sorrentino | H04L 25/0224 455/501 |
| 2013/0156003 A1 | 6/2013 | Liang et al. | |
| 2014/0036737 A1* | 2/2014 | Ekpenyong | H04W 8/245 370/280 |
| 2014/0071936 A1 | 3/2014 | Zhang et al. | |
| 2014/0204853 A1* | 7/2014 | Ko | H04L 5/0048 370/329 |
| 2014/0233494 A1* | 8/2014 | Sorrentino | H04L 5/0091 370/329 |
| 2015/0029982 A1* | 1/2015 | Nagata | H04W 28/18 370/329 |

FOREIGN PATENT DOCUMENTS

| | | |
|---|---|---|
| CN | 102449501 | 5/2012 |
| WO | 2012/130148 | 10/2012 |

OTHER PUBLICATIONS

3rd Generation Partnership Project; Technical Specification Group Radio Access Network; Coordinated multi-point operation for LTE physical layer aspects. Dec. 2011, pp. 1-69. Valbonne, France.
Samsung, 'Summary of COMP UL Session', 3GPP TSG RAN WG1 Meeting #68bis, R1-121843, Mar. 26-30, 2012, Jeju, Korea.
Fujitsu, 'UL DM-RS Enhancements for UL CoMP', 3GPP TSG RAN WG1 Meeting #68bis, R1-121504, Mar. 26-30, 2012, Jeju, Korea.
ZTE, 'Uplink Reference Signal Enhancement for CaMP', 3GPP TSG-RAN WG1 #66bis, R1-113017, Oct. 10-14, 2011, Zhuhai, China.
ZTE, 'DMRS enhancement for UL CaMP', 3GPP TSG RAN WG1 Meeting #68bis, R1-121048, Mar. 26-30, 2012, Jeju, Korea.
NTT DOCOMO, 'Views on UL RS for UL CaMP', 3GPP TSG RAN WG1 Meeting #68bis, R1-121473, Mar. 26-30, 2012, Jeju, Korea.
Notice of Allowance dated Jan. 8, 2015, in U.S. Appl. No. 13/891,522.
Non-Final Rejection dated Aug. 8, 2016, in U.S. Appl. No. 14/703,360.
Non-Final Rejection dated Feb. 13, 2017, in U.S. Appl. No. 14/703,360.
Notice of Allowance dated Jun. 2, 2017, in U.S. Appl. No. 14/703,360.
3GPP "3rd Generation Partnership Project; Technical Specification Group Radio Access Network; Evolved Universal Terrestrial Radio Access (E-UTRA); Physical Channels and Modulation (Release 10)" 3GPP TS 36.211 v10.4.0 Dec. 2011).
JPO Office Action dated May 9, 2017, for the corresponding JP Application No. 2015-511380.
Office Action dated Jan. 29, 2019 from the KIPO.
Nokia Siemens Networks, "Rel-10 DM RS limitations for UL CoMP," R1-113149, 3GPP TSG RAN WG1 Meeting #66bis, Oct. 10-14, 2011, Zhuhai, China.
LG Electronics, "Uplink reference signals for CoMP," R1-113498, 3GPP TSG RAN WG1 Meeting #66bis, Oct. 10-14, 2011, Zhuhai, China.
Panasonic, "UE-specific base sequence assignment for UL CoMP," R1-120229, 3GPP TSG-RAN WG1 Meeting #68, Feb. 6-10, 2012, Dresden, Germany.

* cited by examiner

METHOD AND APPARATUS FOR TRANSMITTING AND RECEIVING REFERENCE SIGNAL IN WIRELESS COMMUNICATION SYSTEM

CROSS-REFERENCE TO RELATED APPLICATIONS

This application is a continuation of U.S. patent application Ser. No. 14/703,360, filed on May 4, 2015, now issued as U.S. Pat. No. 9,787,514 which is a Continuation of U.S. patent application Ser. No. 13/891,522, filed on May 10, 2013, now issued as U.S. Pat. No. 9,025,485 and claims priority from and the benefit of Korean Patent Application No. 10-2012-0050406, filed on May 11, 2012, which is hereby incorporated by reference in its entirety for all purposes as if fully set forth herein.

BACKGROUND

Field

The present invention relates to wireless communication, and more particularly, to a method and an apparatus for transmitting and receiving a reference signal in a wireless communication system. Also, the present invention relates to a method of configuring a parameter for a reference signal in a wireless communication system and a signaling method for the same.

Discussion of the Background

Currently, various communication systems use a variety of reference signals in order to provide information about a communication environment to a counterpart apparatus through an uplink or a downlink.

Further, in order to enhance the communication capacity and performance of a wireless communication system, a multi-cell cooperation or cooperation among transmission/reception points has been introduced. The multi-cell cooperation is also referred to as "Cooperative Multiple Point transmission and reception (CoMP)". Techniques for CoMP include a beam avoidance technique in which adjacent cells cooperate with each other to relieve interference to a user in a cell boundary area, and a joint transmission technique in which adjacent cells cooperate with each other to transmit identical data.

In the next generation wireless communication systems, such as Institute of Electrical and Electronics Engineers (IEEE) 802.16 m or 3rd Generation Partnership Project (3GPP) Long Term Evolution-Advanced (LTE-A), one of important requirements is to improve the performance of users who are located in a cell boundary area and are thus subject to severe interferences from an adjacent cell. In order to address this problem, CoMP may be taken into consideration. A variety of scenarios may be employed for CoMP.

Further, with the discussion about the Multi-User Multi-Input Multi-Output (MU-MIMO) technology as well as CoMP taken into consideration according to the development of wireless mobile communication systems, it may be necessary to properly discriminate or unify reference signals in various communication environments.

Therefore, aspects of the present invention provide a method of configuring a parameter set for a reference signal sequence and a method of signaling information required for the same, in order to perform a dynamic switching to cause uplink reference signals to be identical to each other or different from each other according to User Equipments (UEs) or signal transmission/reception points, in transmitting or receiving the uplink reference signals used for estimation of a channel state from a certain User Equipment (UE) by a signal transmission/reception point, such as a cell or an evolved Node B (eNodeB).

SUMMARY

Aspects of the present invention provide a method and an apparatus for transmitting a reference signal, and a signal signaling method for the same.

Aspects of the present invention provide a method and an apparatus for configuring a parameter set used for generation of a certain uplink reference signal by a UE in a CoMP system, and a method and an apparatus for transmitting a reference signal by using the same.

Aspects of the present invention provide a method of performing a dynamic switching to enable a UE to selectively generate and transmit an uplink reference signal according to the communication environment between two types of uplink reference signals in a CoMP system, and configuring a parameter set for the two types of uplink reference signals.

Aspects of the present invention provide a method of configuring a parameter set for two types of uplink reference signals used when a UE dynamically switches a reference signal according to a communication environment between the two types of uplink reference signals, wherein each parameter set includes a Virtual Cell Identifier (VCID) and a cyclic shift hopping initial value parameter $C_{init}^{CSH}$.

Aspects of the present invention provide a method of configuring a parameter set for two types of uplink reference signals used when a UE dynamically switches a reference signal according to a communication environment between the two types of uplink reference signals, wherein each parameter set includes a cyclic shift hopping initial value parameter $C_{init}^{CSH}$, which is 9-bit information representing one of 510 integer values.

Aspects of the present invention provide a method of configuring a parameter set for two types of uplink reference signals used when a UE dynamically switches a reference signal according to a communication environment between the two types of uplink reference signals, wherein each parameter set includes a cyclic shift hopping initial value parameter $C_{init}^{CSH}$, which is 9-bit information representing one of 510 integer values, and a Virtual Cell Identifier (VCID) configured by 9-bit information in total.

In accordance with aspects of the present invention, there is provided a method of transmitting a reference signal by a User Equipment (UE) in a wireless communication system, the method including: receiving information of one or more combinations of two parameter sets for two types of reference signals from a transmission/reception point, wherein each of the two parameter sets includes a cyclic shift hopping initial value parameter $C_{init}^{CSH}$, which is 9-bit information representing one of 510 integer values; dynamically receiving indication information that indicates a parameter set to be used for generation of the reference signal between the two parameter sets; and generating and transmitting the reference signal based on the parameter set indicated by the indication information.

In accordance with aspects of the present invention, there is provided a method of receiving a reference signal by a transmission/reception point in a wireless communication system, the method including: configuring and transmitting information of one or more combinations of two parameter sets for two types of reference signals to a User Equipment (UE) in order to dynamically select a sequence of the reference signal, wherein each of the two parameter sets includes a cyclic shift hopping initial value parameter $C_{init}^{CSH}$, which is 9-bit information representing one of 510 integer values; generating and transmitting indication information that indicates a parameter set to be used for generation of the reference signal between the two parameter sets to the UE; receiving the reference signal which has been generated and transmitted by the UE based on the parameter set indicated by the indication information; and measuring a channel state of the UE from the received reference signal.

In accordance with aspects of the present invention, there is provided an apparatus to transmit a reference signal in a wireless communication system, the apparatus including: a parameter set information receiver to receive information of one or more combinations of two parameter sets for two types of reference signals from a transmission/reception point, wherein each of the two parameter sets includes a cyclic shift hopping initial value parameter $C_{init}^{CSH}$, which is 9-bit information representing one of 510 integer values; an indication information receiver to receive indication information that indicates a parameter set to be used for generation of the reference signal between the two parameter sets; and a reference signal processor to generate and transmit the reference signal based on the parameter set indicated by the indication information.

In accordance with aspects of the present invention, there is provided an apparatus to receive a reference signal in a wireless communication system, the apparatus including: a parameter set information processor to generate and transmit information of one or more combinations of two parameter sets for dynamic switching of the reference signal to a User Equipment (UE), wherein each of the two parameter sets includes a cyclic shift hopping initial value parameter $C_{init}^{CSH}$, which is 9-bit information representing one of 510 integer values; an indication information processor to generate and transmit indication information that indicates a parameter set to be used for generation of the reference signal between the two parameter sets to the UE; a reference signal receiver to receive the reference signal which has been generated and transmitted by the UE based on the parameter set indicated by the indication information; and a channel state measurer to measure a channel state of the UE from the received reference signal.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
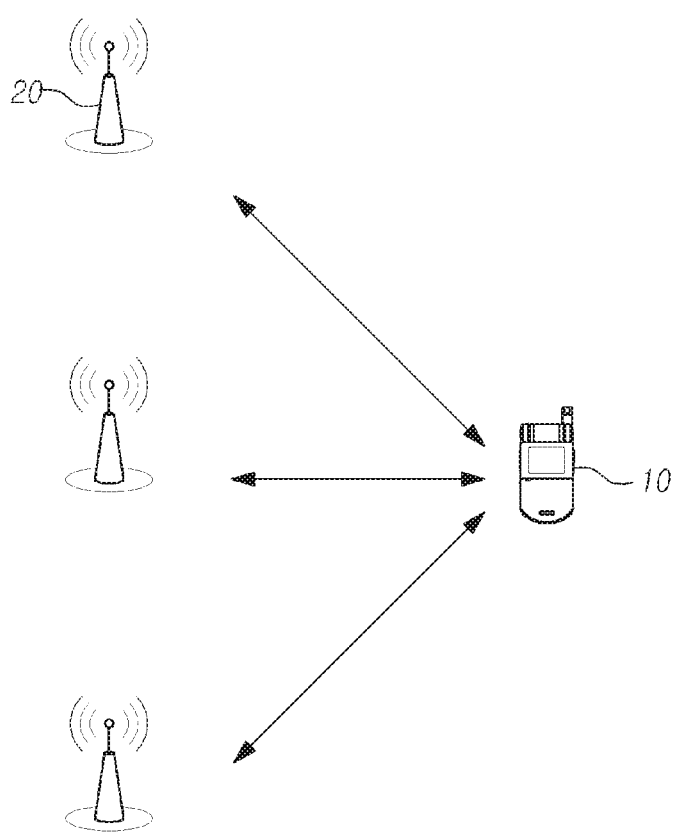
FIG. 1 illustrates a wireless communication system to which embodiments of the present invention are applied.

Hereinafter, exemplary embodiments of the present invention will be described with reference to the accompanying drawings. In the following description and drawings, the same reference numerals are used to designate the same or similar components, and so repetition of the description on the same or similar components will be omitted. In the following description, a detailed description of known functions and configurations incorporated herein will be omitted when it may make the subject matter of the present invention rather unclear.

Further, in the following description, elements of the present invention may be named by using terms, such as the first, the second, A, B, (a), and (b). However, such terms are used only to discriminate those elements from other elements and do not limit the essence, sequence, or order of the elements. If it is read that one element is "connected", "combined", or "attached" to another element, it should be understood that not only may the element be directly connected, combined, or attached to said another element but a third element may also be connected, combined, or attached between the element and said another element.

FIG. 1 illustrates a wireless communication system to which embodiments of the present invention are applied.

A wireless communication system is widely arranged in order to provide various communication services, such as services of voice and packet data.

Referring to FIG. 1, the wireless communication system includes a User Equipment (UE) 10 and a transmission/reception point 20, which performs uplink and downlink communication with the UE 10.

In the present specification, the UE 10 will be interpreted to have an inclusive concept referring to a user terminal in a wireless communication, and to include not only a UE in Wideband Code Division Multiple Access (WCDMA), LTE, and High Speed Packet Access (HSPA), but also a Mobile Station (MS), a User Terminal (UT), a Subscriber Station (SS), a wireless device, etc. in Global System for Mobile Communications (GSM) or user terminals in other mobile communication systems.

The transmission/reception point 20 or the cell generally refers to a station communicating with the UE 10 and may be referred to as another name, such as a Base Station (BS), a Node B, an evolved Node B (eNodeB), a Base Transceiver System (BTS), an access point (AP), and a relay node.

In the present specification, the transmission/reception point 20 or the cell will be interpreted to have an inclusive concept referring to an area covered by a Base Station Controller (BSC) in CDMA, a Node B of WCDMA, etc., and to have an inclusive concept implying all types of devices capable of communicating with one terminal, such as a micro cell, a pico-cell, a femto cell, a site, a sector of a macro cell, a relay node, a Radio Remote Head (RRH) connected to a base station, etc.

In the present specification, the UE 10 and the transmission/reception point 20 have inclusive meanings indicating two main transmitting/receiving agents used to implement the technology or technical concept described herein and are not limited by the particular terms or words used herein.

Although FIG. 1 illustrates one UE 10 and a plurality of transmission/reception points 20, the present invention is not limited to the illustrated configuration. The present invention may be applied to either a configuration in which one transmission/reception point 20 communicates with a plurality of UE 10, a configuration in which one UE 10 communicates with a plurality of transmission/reception point 20 or other configurations.

There is no limit in the multiple access schemes applied to the wireless communication system. Embodiments of the present invention can be applied to various multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, and OFDM-CDMA.

Further, according to aspects of the present invention, uplink transmission and downlink transmission can be applied to a Time Division Duplex (TDD) scheme using different times for transmission, a Frequency Division Duplex (FDD) scheme using different frequencies for transmission, and a Hybrid Duplexing scheme corresponding to a combination of the TDD scheme and the FDD scheme.

Specifically, exemplary embodiments of the present invention can be applied to the fields of asynchronous wireless communication, which has evolved to the LTE and LTE-A through GSM, WCDMA, and HSPA, and the fields of synchronous wireless communication, which has evolved to CDMA, CDMA-2000, and Ultra Mobile Broadband (UMB). Aspects of the present invention are not limited to a particular wireless communication field and will be interpreted to include all technical fields to which the idea of the present invention can be applied.

Referring to FIG. 1, the UE 10 and the transmission/reception point 20 can perform uplink and downlink wireless communication with each other.

The transmission/reception point 20 may perform downlink transmission to the UE 10. The transmission/reception point 20 can transmits a Physical Downlink Shared Channel (PDSCH) as a downlink data channel for unicast transmission. Further, the transmission/reception point 20 may transmit control channels, which include a Physical Downlink Control Channel (hereinafter, referred to as "PDCCH") as a downlink control channel used in order to transmit Downlink Control Information (hereinafter, referred to as "DCI") including scheduling approval information for transmission through an uplink data channel (e.g. a Physical Uplink Shared Channel; "PUSCH") and downlink control information, such as scheduling information necessary for reception of a PDSCH, a Physical Control Format Indicator Channel (PCFICH) for transmitting indicators identifying areas of a PDSCH and a PDCCH, and a Physical HARQ Indicator Channel (PHICH) for transmission of Hybrid Automatic Repeat request (HARQ) confirmation with respect to uplink transmission. In the following description, signal transmission/reception through each channel may be expressed as transmission/reception of the channel.

The UE 10 may perform uplink transmission to the transmission/reception point 20. Further, the UE 10 may transmit a Physical Uplink Control Channel (PUCCH) as an uplink control channel used in order to transmit Uplink Control Information (UCI), which includes a scheduling request that requires resource allocation for transmission of uplink data, a channel state report, and an HARQ ACK (acknowledgement)/NACK (negative ACK), which reports on whether a downlink transmission block has been successfully received or not.

The transmission/reception point 20 may transmit, in the downlink, a Cell-Specific Reference Signal (CRS), a Multicast/Broadcast over Single Frequency Network Reference Signal (MBSFN-RS), a UE-Specific reference signal, a Positioning Reference Signal (PRS), and a Channel Status Information Reference Signal (CSI-RS).

The UE 10 may transmit, in the uplink, a Demodulation Reference Signal (DM-RS) and a Sounding Reference Signal (SRS).

Figure 2:
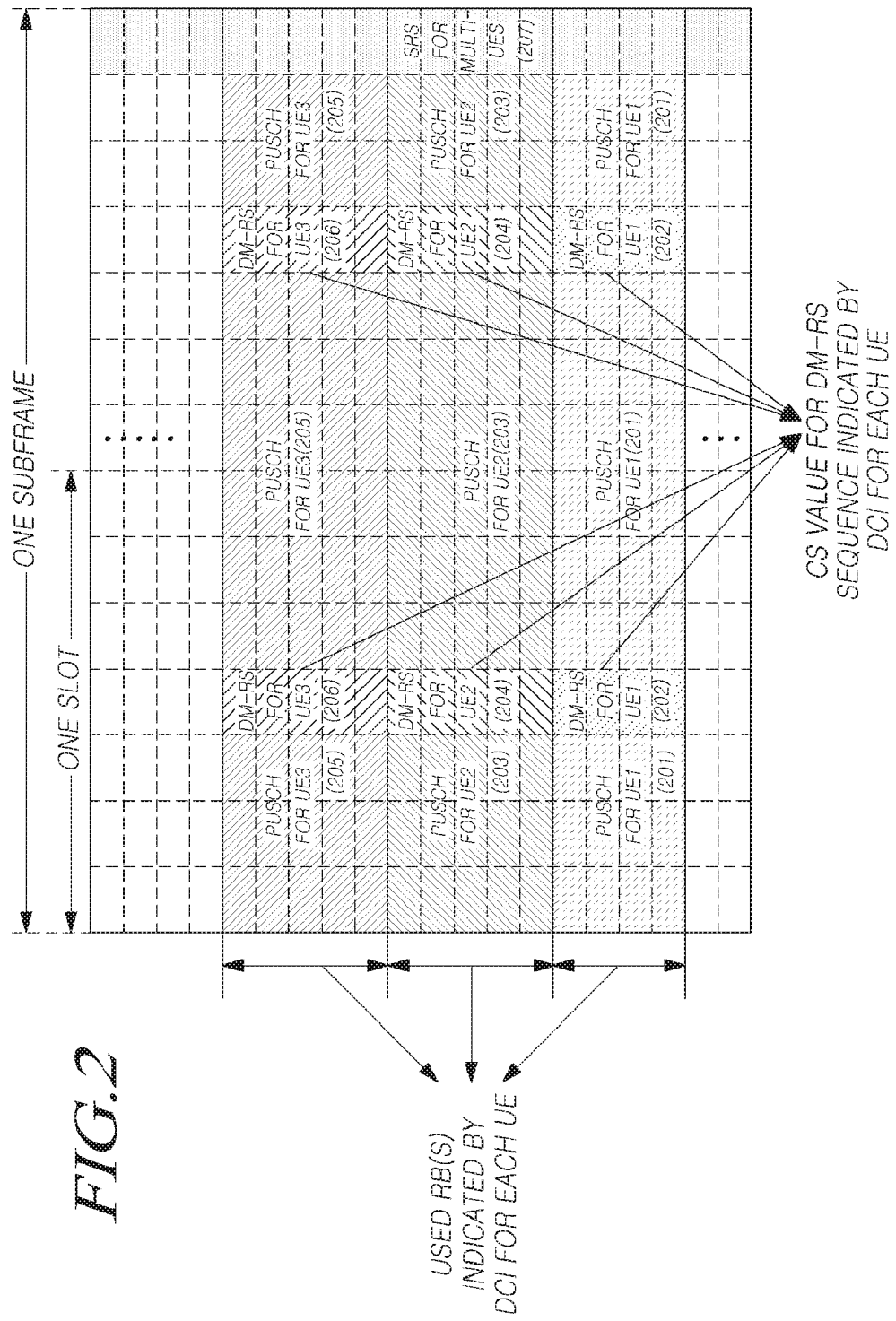
FIG. 2 illustrates an example of a method for transmitting PUSCHs, DM-RSs, and SRSs in an uplink of a wireless communication system according to an exemplary embodiment of the present invention.
Figure 3:
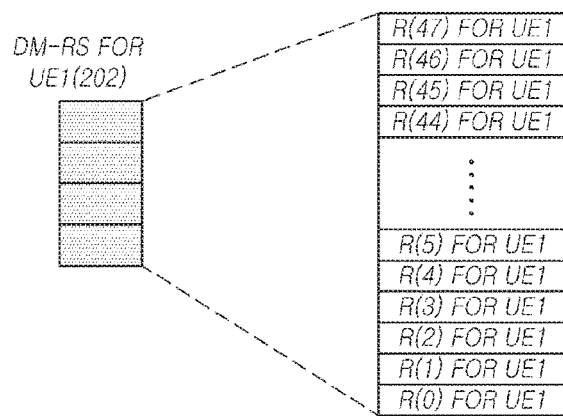
FIG. 3 is an enlarged view of the DM-RS 202 for UE 1 illustrated in the unit of a subcarrier, which is illustrated in the unit of a resource block in FIG. 2, according to an exemplary embodiment of the present invention.

FIG. 2 illustrates an example of a method for transmitting PUSCHs, DM-RSs, and SRSs in an uplink of a wireless communication system according to an exemplary embodiment of the present invention. In FIG. 2, the horizontal axis corresponds to a time axis indicating symbols wherein the entire axis corresponds to one subframe. The vertical axis corresponds to a frequency axis indicating Resource Blocks (RBs). As defined in $3^{rd}$ Generation Partnership Project (3GPP) Technical Specification (TS) 36.211 V10.4.0 (2011-12), "$3^{rd}$ Generation Partnership Project; Technical Specification Group Radio Access Network; Evolved Universal Terrestrial Radio Access (E-UTRA); Physical Channels and Modulation (Release 10)" (hereinafter "TS36.211") and as shown in FIG. 2, one subframe may include a plurality of symbols, e.g., 14 symbols, and one subframe may include two slots. Further, as defined in TS36.211 and as shown in FIGS. 2 and 3, a Resource Block (RB) may include 12 subcarriers in frequency domain and may correspond to the length of one slot (7 symbols for normal cyclic prefix) in time domain. Throughout the specification, exemplary embodiments of the present invention will be described based on the definition of the RB. However, aspects of the present invention are not limited as such. For example, the size of one RB may be defined differently (e.g., one RB may include different numbers of subcarriers in the frequency domain and may have different length in time domain). In the present discussion, the disclosure of TS36.211 is incorporated herein by reference in its entirety.

Referring to FIG. 2, each UE (UE1, UE2, and UE3) may transmit a PUSCH 201, 203, and 205, respectively, to another UE (UE1, UE2, and UE3) through one or more resource block(s) indicated by DCI. DM-RSs 202, 204, and 206, which are reference signals used in order to respectively demodulate PUSCH 201, 203, and 205 and transmitted by a corresponding UE (UE1, UE2, or UE3), may be transmitted in one or more resource block(s) (such as the resource blocks in which the corresponding PUSCH, e.g., a PUSCH 201, 203, or 205, is transmitted). Further, as shown in FIG. 2, the DM-RSs 202, 204, and 206 may be transmitted in a determined location in the frequency axis and the time domain location of the DM-RSs 202, 204, and 206 may be in one symbol of each of the two slots within the subframe in the time axis. The SRS 207 transmitted by the UEs may be transmitted through the last symbol of the subframe.

The DM-RS 202, 204, and/or 206 may be associated with a transmission of a PUCCH or the DM-RS 202, 204, and 206 may be associated with a transmission of a PUSCH 201, 203, and 205, respectively, (FIG. 2 shows a DM-RS associated with a transmission of a PUSCH). The DM-RS 202, 204, or 206 is transmitted mainly for channel estimation for demodulation. In this event, the DM-RS 202, 204, or 206 is transmitted in each slot within each subframe in which a PUCCH or a corresponding PUSCH, e.g., a PUSCH 201, 203, or 205, is transmitted. Further, information of a transmission bandwidth (BW) of the DM-RS 202, 204, or 206, which may be represented resource block by resource block, is associated with transmission of a PUCCH or transmission of a corresponding PUSCH, e.g., a PUSCH 201, 203, or 205. For example, as shown in FIG. 2, the DM-RSs 202, 204, and 206 respectively associated with the PUSCH 201, 203, and 205 are transmitted in the corresponding resource block(s) to which the PUSCH 201, 203, or 205 is allocated. Therefore, the resource block allocation information of the DM-RS is based on the resource block allocation information of the PUSCH. In this event, the resource blocks in which the PUSCH 201, 203, or 205 is allocated to the corresponding UE depend on a field value for resource block allocation of Downlink Control Information (DCI).

FIG. 3 is an enlarged view of the DM-RS 202 for UE1 illustrated in the unit of a subcarrier, which is illustrated in the unit of resource block in FIG. 2, according to an exemplary embodiment of the present invention. For example, the DM-RS 202 for UE1 in FIG. 2 is transmitted through four resource blocks, wherein the four resource blocks (each block includes 12 subcarriers) include a total of 48 subcarriers r(0) to r(47).

Meanwhile, a current DM-RS sequence is transmitted after being mapped to all subcarriers within a resource block used for transmission of the DM-RS. In this event, the DM-RS sequence is generated with a length ($M_{sc}^{RS}$ = the number of used RBs × the number of subcarriers within a corresponding RB) corresponding to the RB used for transmission of a DM-RS, which is obtained by Cyclic-Shifting (CS) of a base sequence $\bar{r}_{u,v}(n)$ based on Zadoff-Chu sequence as shown in Equation (1) below. The number of subcarriers within the corresponding RB is usually 12, but is not limited as such.

In this event, the base sequence may be generated differently according to each cell and according to each slot (that is, values of u and v of the base sequence may be different according to the cell identifier and the slot number within the subframe). The Cyclic Shift (CS) value $\alpha_\lambda$ may be generated differently according to each UE and each layer.

$$r_{PUSCH}^{(\lambda)}(m \cdot M_{sc}^{RS} + n) = w^{(\lambda)}(m) r_{u,v}^{(\alpha_\lambda)}(n),$$
$$r_{u,v}^{(\alpha_\lambda)}(n) = e^{j\alpha_\lambda n} \bar{r}_{u,v}(n), 0 \leq n < M_{sc}^{RS}$$
$$m = 0, 1, n = 0, \ldots, M_{sc}^{RS} - 1, M_{sc}^{RS} = M_{sc}^{PUSCH}$$
$$\alpha_\lambda = 2\pi n_{cs,\lambda}/12, n_{cs,\lambda} = (n_{DMRS}^{(1)} + n_{DMRS,\lambda}^{(2)} + n_{PN}(n_s)) \bmod 12 \quad \text{Equation (1)}$$

The 'u' value of the base sequence refers to a sequence-group number, which is defined by Equation (2) below.

As noted in Equation (2), the sequence-group number 'u' can be obtained by adding a group hopping pattern $f_{gh}(n_s)$ and a sequence-shift pattern $f_{ss}$ and then performing a modulo 30 operation on the sum. As a result, the sequence-group number 'u' may have a total of 30 values from 0 to 29.

As noted in Equation (2), the group hopping pattern $f_{gh}(n_s)$ has a value of 0 when the group hopping has been disabled, and has a value determined by the cell identifier $N_{ID}^{cell}$ and the slot number $(n_s)$ when the group hopping has been enabled. Further, as noted in Equation (2), the sequence-shift pattern $f_{ss}$ is defined differently in a DM-RS for a PUCCH and a DM-RS for a PUSCH. Specifically, the sequence-shift pattern $f_{ss}$ has a value determined according to the cell identifier $N_{ID}^{cell}$ in the case of a DM-RS for a PUCCH and has a value determined according to the cell identifier $N_{ID}^{cell}$ and a value $\Delta_{ss}$ signaled from a higher layer in the case of a DM-RS for a PUSCH.

$$u = (f_{gh}(n_s) + f_{ss}) \bmod 30; \quad \text{Equation (2)}$$

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

$$f_{ss}^{PUSCH} = N_{ID}^{cell} \bmod 30$$

$$f_{ss}^{PUSCH} = (f_{ss}^{PUSCH} + \Delta_{ss}) \bmod 30 \, (\Delta_{ss} \in \{0, 1, \ldots, 29\})$$

Here, the pseudo-random sequence c(i) is defined by a length-31 Gold sequence, and a pseudo-random sequence generator shall be initialized with $$c_{init} = \left\lfloor \frac{N_{ID}^{cell}}{30} \right\rfloor$$

at the beginning of each radio frame.

Meanwhile, the 'v' value of the base sequence mentioned above refers to a base sequence number within the sequence-group, which is defined by Equation (3) below. As noted in Equation (3), the base sequence number 'v' is determined by the cell identifier $N_{ID}^{cell}$, the slot number $n_s$, and the value $f_{ss}^{PUSCH}$ defined by Equation (2) when the group hopping has been disabled and the sequence hopping has been enabled, otherwise the base sequence number 'v' is 0.

$$v = \begin{cases} c(n_s) & \text{if group hopping is disabled and} \\ & \text{sequence hopping is enabled} \\ 0 & \text{otherwise} \end{cases} \quad \text{Equation (3)}$$

Here, the pseudo-random sequence c(i) is defined by a length-31 Gold sequence, and a pseudo-random sequence generator shall be initialized with $$c_{init} = \left\lfloor \frac{N_{ID}^{cell}}{30} \right\rfloor \cdot 2^5 + f_{ss}^{PUSCH}$$

at the beginning of each radio frame. An example of the pseudo-random sequence c(i) defined by the length-31 Gold sequence is illustrated in TS36.211. For example, the pseudo-random sequence c(i) of length $M_{PN}$, where n=0, 1, . . . , $M_{PN}$−1, is defined by $$c(n) = (x_1(n + N_C) + x_2(n + N_C)) \bmod 2$$
$$x_1(n + 31) = (x_1(n + 3) + x_1(n)) \bmod 2$$
$$x_2(n + 31) = (x_2(n + 3) + x_2(n + 2) + x_2(n + 1) + x_2(n)) \bmod 2$$

where $N_C$=1600 and the first m-sequence shall be initialized with $x_1(0)$=1, $x_1(n)$=0, n=1, 2, . . . , 30. The initialization of the second m-sequence is denoted by $C_{init} = \sum_{i=0}^{30} x_2(i) \cdot 2^i$ with the value depending on the application of the sequence.

Meanwhile, $n_{cs,\lambda}$ used for calculation of the cyclic shift (CS) value is obtained by performing a modulo 12 operation on a total of three types of parameter values as noted in Equation (1). In this event, different from the other parameters, the parameter $n_{DMRS,\lambda}^{(2)}$ has different values according to the UEs when it is transmitted, and is transmitted through a 3-bit value included in the DCI. Meanwhile, $n_{DMRS}^{(1)}$ is a cyclic shift offset parameter of 3 bits and transmitted with cell-specific manner. Further, $n_{PN}(ns)$ relating to Cyclic Shift Hopping (CSH) is defined by Equation (4) below.

$$n_{PN}(n_s) = \Sigma_{i=0}^{7} c(8N_{symb}^{UL} \cdot n_s + i) \cdot 2^i \qquad \text{Equation (4)}$$

Here, the pseudo-random sequence c(i) is defined by a length-31 Gold sequence, and a pseudo-random sequence generator shall be initialized with $$c_{init} = \left\lfloor \frac{N_{ID}^{cell}}{30} \right\rfloor \cdot 2^5 + f_{ss}^{PUSCH}$$

at the beginning of each radio frame.

Further, $w^{(\lambda)}$ corresponding to an orthogonal cover code (OCC) used in the generation of a DM-RS sequence has a value, which is also indicated by the 3-bit value dynamically transmitted through the DCI. Table 1 below shows an example of the 3-bit values used in order to indicate $n_{DMRS,\lambda}^{(2)}$ and $w^{(\lambda)}$, and values of the indicated $n_{DMRS,\lambda}^{(2)}$ and $w^{(\lambda)}$.

TABLE 1

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

In the meantime, CoMP has CoMP scenario 1/2/3 environments in which transmission/reception points have different cell identifiers (IDs) and a CoMP scenario 4 environment in which transmission/reception points have the same cell identifier (ID).

Also, according to whether a UE is located at a cell edge, according to whether to apply the CoMP scheme, and according to the CoMP scenario, it may be required to guarantee inter-cell (or inter-point) orthogonality at the time of transmitting a reference signal to a UE. Also, when the inter-cell (or inter-point) orthogonality is not inevitably required, there may be a case in which a pseudo randomization or quasi-orthogonality state for inter-cell (or inter-point) interference randomization is guaranteed.

According to an exemplary embodiment of the present invention, when a UE transmits uplink DM-RSs, the DM-RSs should have the same base sequence in order to guarantee the inter-cell orthogonality, and this orthogonality can be secured through different cyclic shifts (CSs), as shown in Table 1, an orthogonal cover code (OCC), etc. In an inter-point pseudo randomization or inter-point quasi-orthogonality state, the DM-RSs should have different base sequences.

Therefore, according to the communication environments, a dynamic switching is necessary between a mode for randomizing an inter-cell interference and a mode for providing an inter-cell orthogonality as described above, which will be described below in more detail.

That is, a dynamic switching may be necessary between two configuration sets or parameter sets, and an exemplary adaptation scenario is as follows.

There are a first mode, which requires generation of the same DM-RS base sequence among UEs in order to guarantee an inter-cell orthogonality or an inter-point orthogonality, and a second mode, such as a mode in a pseudo randomization or quasi-orthogonality state, in which different DM-RS base sequences are generated among UEs. Both the first mode and the second mode may be subdivided according to the CoMP scenario.

In the first mode requiring the generation of the same DM-RS base sequence, a common base sequence should be generated within a CoMP set in the case of CoMP scenario 1/2/3. However, since cell IDs are basically different from each other in CoMP scenario 1/2/3, it is necessary to separately signal a common parameter for generating a common DM-RS sequence to the UE.

Meanwhile, in the case of CoMP scenario 4 having the same cell ID, there is no problem in generating a DM-RS sequence based on a cell or transmission/reception point to which the UE belongs in accordance with one of the current schemes, e.g., the existing scheme in 3GPP Release 10 including TS36.211 (for example, 3GPP LTE Release 10 (LTE Rel-10); See also e.g., TS36.211). That is, since the cell ID is the same among transmission/reception points in CoMP scenario 4, it is possible to generate the same base sequence even when the base sequence is generated in the current cell-specific scheme.

The second mode in which different DM-RS base sequences are generated among UEs is opposite to the first mode. That is, in CoMP scenario 1/2/3 having different cell IDs, there is no problem in generating a DM-RS sequence based on a cell or transmission/reception point to which the UE belongs in accordance with the current scheme (for example, LTE Rel-10). However, in CoMP scenario 4 having the same cell ID, it is necessary to signal separate parameters to the UE in order to generate specific base sequences different according to the UEs or transmission/reception points.

In other words, in the case of both CoMP scenario 4 and the second mode requiring generation of different DM-RS base sequences, since the cell ID is identical among transmission/reception points and generation of a base sequence according to the current-cell specific scheme thus makes it impossible to generate different base sequences, a separate signaling is necessary in order to generate a UE-specific (or point-specific) base sequence.

As described above, two parameter sets may be defined and used for dynamic switching between the first mode and the second mode according to the communication environments.

A method for defining two parameter sets (including parameter sets A and B) may be implemented as follows without limiting the present invention thereto.

First, parameter set A or the first parameter set may be defined as a parameter set for generating a base sequence based on a cell or transmission/reception point to which the UE belongs according to the current scheme (for example, LTE Rel-10). Since the first parameter set as described above is allowed to use the current cell ID without change, it could be transmitted to the UE through Radio Resource Control (RRC) signaling, etc. Of course, since it corresponds to information already known to the UE, it may not be separately signaled.

Further, parameter set B or the second parameter set may be defined as a parameter set for generating a common base sequence in the case of CoMP scenario 1/2/3 or a parameter set for generating different UE-specific (or point-specific) base sequences in the case of CoMP scenario 4, differently from the parameter set for the current cell ID, etc. Since parameter set B does not correspond to information already known to the UE, the transmission/reception point should separately configure and signal parameter set B to the UE through RRC signaling, etc.

The configuration of the two parameter sets is not limited to the method described above. For example, parameter set A may be defined as a set of parameters for generating a common base sequence (that is, existing parameters, such as existing cell ID, in the case of CoMP scenario 4 and parameters separately configured in the case of CoMP scenario 1/2/3) and parameter set B may be defined as a set of parameters for generating different UE-specific (or point-specific) base sequences (parameters separately configured in the case of CoMP scenario 4 and existing parameters, such as existing cell ID, in the case of CoMP scenario 1/2/3). The existing parameters may include cell ID defined in TS36.211.

Further, in addition to the operation of configuring and transmitting one or more combinations of the two types of parameter sets defined as described above, the transmission/reception point may configure and transmit "indication information," which indicates one parameter set to be selected for use in generation of a DM-RS from the two types of parameter sets by the UE.

This indication information implies the followings according to the configuration of a network to which the UE belongs, for example, according to whether the CoMP scenario is CoMP scenario 1/2/3 or CoMP scenario 4.

In the case of CoMP scenario 1/2/3, the indication information indicates whether to use a common base sequence for the inter-cell orthogonality or different UE-specific (or point-specific) base sequences generated based on a cell (transmission/reception point) including the UE according to the existing scheme (for example, LTE Rel-10), and indicates a corresponding parameter set between two types of parameter sets.

In the case of CoMP scenario 4, the indication information indicates whether to use a common base sequence generated based on a cell (transmission/reception point) including the UE in order to secure the inter-cell orthogonality using the existing scheme (for example, LTE Rel-10) or the different UE-specific (or point-specific) base sequences, and indicates a corresponding parameter set between two types of parameter sets.

The indication information, which indicates one parameter set to be selected for use in generation of a DM-RS from the two types of parameter sets (including parameter set A and parameter set B), may be dynamically transmitted to the UE. The indication information may be either explicitly indicated through an additional 1 bit included in the DCI or implicitly indicated in connection with an indication field (for example, the RB allocation field or the CS field in Table 1) in relation to an uplink DM-RS in the existing DCI, without limiting the present invention thereto.

Also, there may be various schemes for determining parameters as elements of the two types of parameter sets, without limiting the present invention to the two exemplary schemes described below as examples thereof.

In the first exemplary scheme, each parameter set includes a Virtual Cell Identifier (VCID) by a base sequence index and a parameter of an initial value $C_{init}^{CSH}$ for cyclic shift hopping.

That is, in the first exemplary scheme, the parameter set is configured by $\{VCID, C_{init}^{CSH}\}$. Specifically, parameter sets A and B may be expressed as $\{VCID_0, C_{init,0}^{CSH}\}$, $\{VCID_1, C_{init,1}^{CSH}\}$, respectively. Parameter sets A and B are independently configured and parameters in each parameter set are also independently configured. Further, a part or all of the parameters may be transmitted to the UE through higher layer signaling, such as RRC.

Further, as described above, the indication information, indicating one parameter set to be selected for use in generation of a DM-RS from the two types of parameter sets (including parameter set A and parameter set B), may be dynamically transmitted to the UE.

In the second exemplary scheme for configuration of the parameter set, parameters configuring each parameter set include a cell ID and a sequence initial value as in the first exemplary scheme. However, between the parameter sets, one parameter set (for example, parameter set A) includes the same cell ID $N_{ID}^{cell}$ and sequence initialization value $C_{init}$ as those of the existing communication scheme, LTE Rel-10, and the other parameter set (for example, parameter set B) includes an initial value $C_{init}^{CSH}$ for cyclic shift hopping and a Virtual Cell Identifier (VCID) requiring a separate signaling, as parameters thereof. That is, in the second exemplary scheme, parameter sets A and B may be expressed as $\{N_{ID}^{cell}, C_{init}\}$ (which corresponds to LTE Rel-10) and $\{VCID, C_{init}^{CSH}\}$, respectively.

The Virtual Cell Identifier (VCID) parameter included in the parameter set of the first exemplary scheme and the second exemplary scheme corresponds to a parameter, which is applied in place of the parameter $N_{ID}^{cell}$ in Equation (2) defining a method of generating 'u' value (sequence-group number) of the base sequence and Equation (3) defining a method of generating 'v' value (base sequence number within a sequence-group number) of the base sequence, and may be differently expressed, for example, as $n_{ID}^{RS}$, although it is expressed as a VCID in this specification.

The VCID value may be separately configured for parameter set A (parameters of which are configured by values for generating a common uplink DM-RS sequence within the CoMP set) and parameter set B (parameters of which are configured by values for generating different UE-specific (or point-specific) uplink DM-RS sequences) in the first exemplary scheme.

Further, in the second exemplary scheme, between the two parameter sets, one parameter set in the case of generating a base sequence based on a transmission/reception point to which the UE belongs, as in e.g., LTE Rel-10, may have a value of $N_{ID}^{cell}$, and the other parameter set may have a common value within the CoMP set or different UE-specific (or point-specific) values.

That is, the VCID value may be the same value as the existing value $N_{ID}^{cell}$ in the case of generating a base sequence based on the cell (transmission/reception point) to which the UE belongs as in the current communication scheme (for example, LTE Rel-10) in the exemplary second scheme, or may be a common value within a CoMP set or different UE-specific (or point-specific) values in the first exemplary scheme.

Meanwhile, the parameter $C_{init}^{CSH}$ included in the parameter set corresponds to a parameter, which is applied in place of the parameter $C_{init}$ in Equation (4) defining a method of generating $n_{PN}(n_s)$ relating to Cyclic Shift Hopping (CSH). In the present embodiment, the parameter $C_{init}^{CSH}$ is used as the same expression as a "cyclic shift hopping initial value parameter". The "cyclic shift hopping initial value parameter" is not limited to the expression of $C_{init}^{CSH}$ and may be expressed differently, for example, as $N_{ID}^{csh\_DMRS}$.

The value of the parameter $C_{init}^{CSH}$ may be separately configured for parameter set A (parameters of which are configured by values for generating a common uplink DM-RS sequence within the CoMP set) and parameter set B (parameters of which are configured by values for generating different UE-specific (or point-specific) uplink DM-RS sequences) in the first exemplary scheme.

Further, in the second exemplary scheme, between the two parameter sets, one parameter set in the case of generating a Cyclic Shift Hopping (CSH) based on a cell (transmission/reception point) to which the UE belongs, as in e.g., LTE Rel-10, may have a value of $C_{init}$ (wherein the value $C_{init}$ may be a value which is not signaled but is calculated to using $N_{ID}^{cell}$, etc. as in e.g., LTE Rel-10), and the other parameter set may have a common value within the CoMP set or different UE-specific (or point-specific) values.

The configurations of the two types of parameter sets in the first exemplary scheme and the second exemplary scheme as described above are exemplary, and other parameters may be added to the configurations according to the use thereof.

Meanwhile, based on the scheme of configuring a VCID, which is a virtual cell ID parameter, i.e. based on the range in which the VCID parameter is usable, in the first exemplary scheme and the second exemplary scheme as described above, there may be three schemes including the virtual cell ID parameter configuration schemes 1 to 3.

Virtual Cell ID (VCID) parameter configuration scheme 1:

In VCID parameter configuration scheme 1, the range of a value, which the VCID may have, is determined to be the same as $N_{ID}^{cell}$ in the conventional LTE Rel-10. That is, in VCID parameter configuration scheme 1, the VCID parameter has an integer value among values from 0 to 503 and can be expressed by a total of 9 bits.

Virtual Cell ID (VCID) parameter configuration scheme 2:

VCID parameter configuration scheme 2 is similar to VCID parameter configuration scheme 1. However, in VCID parameter configuration scheme 2, since $N_{ID}^{cell}$ is expressed by 9 bits, the range of a value, which the VCID may have, include the other values within the 9 bits as well as the integer values from 0 to 503. That is, in VCID parameter configuration scheme 2, the VCID parameter has an integer value among values from 0 to 511. Further, in VCID parameter configuration scheme 2, the VCID parameter can be expressed by a total of 9 bits.

Virtual Cell ID (VCID) parameter configuration scheme 3:

In VCID parameter configuration scheme 3, the range of a value, which the VCID may have, is determined to be 510 values corresponding to the number of theoretical kinds of group hopping patterns $f_{gh}(n_s)$ and sequence-shift patterns $f_{ss}$ defined by Equations (2) and (3), respectively.

Specifically, in VCID parameter configuration scheme 3, the number of possible cases of the group hopping patterns $f_{gh}(n_s)$ used for generation of an uplink reference signal (UL DM-RS) sequence is a total of 17 from 0 to 16 as noted from the mathematical expression $\lfloor N_{ID}^{cell}/30 \rfloor$ in Equations (2) and (3) because $N_{ID}^{cell}$ has an integer value among values from 0 to 503. Further, the number of possible cases of the sequence-shift pattern $f_{ss}$ used for generation of an uplink reference signal (UL DM-RS) sequence is 30 from 0 to 29 as noted from the mathematical expression $f_{ss}^{PUSCH}=(f_{ss}^{PUCCH}+\Delta_{ss})$mod 30 in Equations (2) and (3). As a result, by using the number of possible cases of the group hopping patterns $f_{gh}(n_s)$ and the number of possible cases of the sequence-shift pattern $f_{ss}$, 510 values (=17×30) are obtained as the range of the VCID value.

Therefore, in VCID parameter configuration scheme 3, the range of a value, which the VCID parameter may have, includes integer values from 0 to 509, wherein the VCID parameter can be expressed by a total of 9 bits.

That is, in each of VCID parameter configuration schemes 1 to 3, the VCID parameter is expressed by a total of 9 bits and the transmission/reception point generates parameter sets A and/or B including the VCID parameter expressed by 9 bits and then transmits the generated VCID parameter to the UE through RRC signaling.

Meanwhile, the $C_{init}^{CSH}$ parameter, which corresponds to a cyclic shift hopping initial value parameter, is a parameter used in place of $C_{init}$ in Equation (4). For $n_{PN}(n_s)$ relating to the Cyclic Shift Hopping (CSH) in LTE Rel-10, the value $C_{init}$ is defined as $$c_{init} = \left\lfloor \frac{N_{ID}^{cell}}{30} \right\rfloor \cdot 2^5 + f_{ss}^{PUSCH},$$

as noted in Equation (4). Here, $\lfloor N_{ID}^{cell}/30 \rfloor$ is expressed by a total of 17 values from 0 to 16 and $f_{ss}^{PUSCH}$ is expressed by a total of 30 values from 0 to 29. Therefore, $C_{init}$ has a value among 0~29, 32~61, 64~93, . . . , and 512~541 (that is, $C_{init}$ may have one of the remaining integer values except for the integer values having a remainder of 30 or 31 among integer values from 0 to 541 when the integer values from 0 to 541 are divided by 32).

Schemes of configuring the cyclic shift hopping initial value parameter $C_{init}^{CSH}$ may include four schemes including $C_{init}^{CSH}$ parameter configuration schemes 1 to 4, which are described below.

For reference, the parameter $C_{init}^{CSH}$ is used in place of $C_{init}$ in Equation (4). In other words, when $C_{init}^{CSH}$ parameter configuration schemes 1 to 4 according to exemplary embodiments of the present invention are applied, $$c_{init} = \left\lfloor \frac{N_{ID}^{cell}}{30} \right\rfloor \cdot 2^5 + f_{ss}^{PUSCH},$$

which is a mathematical expression defining $C_{init}$ of Equation (4) (Equation (4) defined in LTE Rel-10) described above, is replaced by Equations (5) to (8), respectively.

$C_{init}^{CSH}$ parameter configuration scheme 1:

In $C_{init}^{CSH}$ parameter configuration scheme 1, the $C_{init}^{CSH}$ parameter is configured to have all integer values within a range from the minimum value of $C_{init}$ to the maximum value thereof in LTE Rel-10 as noted in Equation (5). Therefore, the $C_{init}^{CSH}$ parameter configuring parameter sets A and/or B has an integer value among values from 0 to 541 and is expressed by a total of 10 bits.

$C_{init}=C_{init}^{CSH}$ where $C_{init}^{CSH} \in \{0,1,2,\ldots,541\}$   Equation (5)

That is, $C_{init}^{CSH}$ in parameter configuration scheme 1, the transmission/reception point configures a parameter set including the $C_{init}^{CSH}$ parameter (10-bit information) of integer values from 0 to 541 and transmits the configured parameter set to the UE, and the UE generates and transmits a reference signal by using the $C_{init}^{CSH}$ parameter included in a parameter set determined by predetermined indication information without change as a sequence initialization value $C_{init}$.

$C_{init}^{CSH}$ parameter configuration scheme 2:

In $C_{init}^{CSH}$ parameter configuration scheme 2, the $C_{init}^{CSH}$ parameter uses all values expressed by 10 bits as noted in Equation (6) below. That is, while only integer values from 0 to 541 are used in $C_{init}^{CSH}$ parameter configuration scheme 1, all values from 0 to 1023, which can be expressed by 10 bits, may be used in $C_{init}^{CSH}$ parameter configuration scheme 2.

As described above, $C_{init}^{CSH}$ parameter configuration scheme 2 is different from $C_{init}^{CSH}$ parameter configuration scheme 1 in that $C_{init}^{CSH}$ parameter may have the other bit values within the 10 bits in consideration that a total of 10 bits are used in $C_{init}^{CSH}$ parameter configuration scheme 1 among a total of 31 bits of the initialization value based on the Gold sequence.

Therefore, in $C_{init}^{CSH}$ parameter configuration scheme 2, the $C_{init}^{CSH}$ parameter may have an integer value within a range of values from 0 to 1023 and is expressed by a total of 10 bits.

$$C_{init} = C_{init}^{CSH} \text{ where } C_{init}^{CSH} \in \{0,1,2,\ldots,1023\} \quad \text{Equation (6)}$$

That is, in $C_{init}^{CSH}$ parameter configuration scheme 2, the transmission/reception point configures a parameter set including the $C_{init}^{CSH}$ parameter (10-bit information) of integer values from 0 to 1023 and transmits the configured parameter set to the UE, and the UE generates and transmits a reference signal by using the $C_{init}^{CSH}$ parameter included in a parameter set determined by predetermined indication information without change as a sequence initialization value $C_{init}$.

$C_{init}^{CSH}$ parameter configuration scheme 3:

$C_{init}^{CSH}$ parameter configuration scheme 3 uses only practical values capable of configuring the $C_{init}$ value in the conventional communication scheme (LTE Rel-10) as the $C_{init}^{CSH}$ to parameter, as noted in Equation (7) below.

That is, among 542 integer values from 0 to 541 expressed by a total of 10 bits, the $C_{init}^{CSH}$ parameter may have one of only a total of 510 integer values, which are the remaining integer values except for the integer values having a remainder of 30 or 31 among the integer values from 0 to 541 when the integer values from 0 to 541 are divided by 32. In other words, the $C_{init}^{CSH}$ parameter may have a value among 0~29, 32~61, 64~93, . . . , and 512~541, and can be expressed by a total of 10 bits.

In $C_{init}^{CSH}$ parameter configuration scheme 3 as described above, a case where the $C_{init}^{CSH}$ parameter has an integer value having a remainder of 30 or 31 among the integer values from 0 to 541 when the integer value is divided by 32 may be considered as an erroneous case.

$$C_{init} = C_{init}^{CSH} \text{ where } C_{init}^{CSH} \in \{0,1,2,\ldots,541\} \text{ and } C_{init}^{CSH} \mod 32 \neq \{30,31\} \quad \text{Equation (7)}$$

That is, $C_{init}^{CSH}$ in parameter configuration scheme 3, the transmission/reception point configures a parameter set including the $C_{init}^{CSH}$ parameter (10-bit information), which has one of the remaining integer values except for the integer values having a remainder of 30 or 31 among integer values from 0 to 541 when the integer values from 0 to 541 are divided by 32, and transmits the configured parameter set to the UE, and the UE generates and transmits a reference signal by using the $C_{init}^{CSH}$ parameter included in a parameter set determined by predetermined indication information without change as a sequence initialization value $C_{init}$.

$C_{init}^{CSH}$ parameter configuration scheme 4:

In $C_{init}^{CSH}$ parameter configuration schemes 1 to 3 as described above, one of 542 integer values (configuration scheme 1), 1024 integer values (configuration scheme 2), or 510 integer values (configuration scheme 3), which are expressed by a total of 10 bits, is used as the $C_{init}^{CSH}$ parameter, and the signaled $C_{init}^{CSH}$ parameter is used without change as a sequence initialization value.

However, in $C_{init}^{CSH}$ parameter configuration scheme 4, a $C_{init}^{CSH}$ parameter, which is one of 510 integer values from 0 to 509 expressed by a total of 9 bits, is included in a signaled parameter set, and the UE calculates and uses a sequence initialization value $C_{init}$ relating to a cyclic shift hopping by using Equation (8) and the $C_{init}^{CSH}$ parameter.

As described above, in $C_{init}^{CSH}$ parameter configuration scheme 4, the signaled $C_{init}^{CSH}$ parameter may have a total of 510 integer values from 0 to 509, which are substantial values capable of configuring the $C_{init}$ value in LTE Rel-10, as noted in Equation (8) below. Therefore, the signaled $C_{init}^{CSH}$ parameter is expressed by a total of 9 bits.

Although the $C_{init}^{CSH}$ parameter has one of 510 integer values from 0 to 509 expressed by the 9 bits signaled in order to calculate the sequence initialization value $C_{init}$ relating to the cyclic shift hopping in the above description, aspects of the present invention are not limited to this description and are available for use of another term or expression.

That is, in $C_{init}^{CSH}$ parameter configuration scheme 4, when a value signaled from a higher layer, such as an RRC layer, in place of $C_{init}$ in Equation (4) is the $C_{init}^{CSH}$ parameter (this value may be expressed by another term or another expression), the $C_{init}$ value is determined by Equation (8) below.

Further, the $C_{init}$ value determined by Equation (8) based on the $C_{init}^{CSH}$ parameter may have one of a total of 510 integer values, which are the remaining integer values except for the integer values having a remainder of 30 or 31 among the 542 integer values from 0 to 541 when the integer values are divided by 32, as in the configuration scheme 3.

Therefore, in comparison with $C_{init}^{CSH}$ parameter configuration schemes 1 to 3, $C_{init}^{CSH}$ parameter configuration scheme 4 can reduce one signaling bit. Also, in $C_{init}^{CSH}$ is parameter configuration schemes 1 to 3, the signaled value $C_{init}^{CSH}$ is used without change as the $C_{init}$ value. However, in $C_{init}^{CSH}$ parameter configuration scheme 4, the $C_{init}$ value is determined by Equation (8) based on the signaled value $C_{init}^{CSH}$.

$$C_{init} = \lfloor C_{init}^{CSH}/30 \rfloor \cdot 2^5 + (C_{init}^{CSH} \mod 30) \text{ where } C_{init}^{CSH} \in \{0,1,2,\ldots,509\} \quad \text{Equation (8)}$$

As described above, in an exemplary embodiment of the present invention, a transmission/reception point, which estimates a channel by receiving an uplink reference signal, such as a DM-RS, configures two types of parameter sets according to the communication environment, such as a CoMP scenario, and then transmits the configured parameter sets to the UE. Further, the transmission/reception point dynamically transmits indication information, which indicates a parameter set to be actually used for generation of a reference signal between the two types of parameter sets, to the UE, wherein the two types of parameter sets include a Virtual Cell Identifier (VCID) parameter and a cyclic shift hopping initial value parameter $C_{init}^{CSH}$, which is configured by one integer value among values from 0 to 509 expressed by a total of 9 bits in the case of $C_{init}^{CSH}$ parameter configuration scheme 4 (of course, the cyclic shift hopping initial value parameter $C_{init}^{CSH}$ may be expressed by a total of 10 bits the case of $C_{init}^{CSH}$ parameter configuration schemes 1 to 3).

The UE calculates an actual cyclic shift hopping initial value $C_{init}$ by Equation (8) using the cyclic shift hopping initial value parameter $C_{init}^{CSH}$ included in the parameter set, generates a reference signal based on the calculated value, and then transmits the generated reference signal to the transmission/reception point.

In this event, the Virtual Cell Identifier (VCID) parameter may also have an integer value among values from 0 to 509 expressed by a total of 9 bits in the case of VCID parameter configuration scheme 3 (of course, the Virtual Cell Identifier (VCID) parameter may have an integer value among values from 0 to 503 (configuration scheme 1) or among values from 0 to 511 (configuration scheme 2) expressed by a total of 9 bits in the case of VCID parameter configuration scheme 1 or 2).

Figure 4:
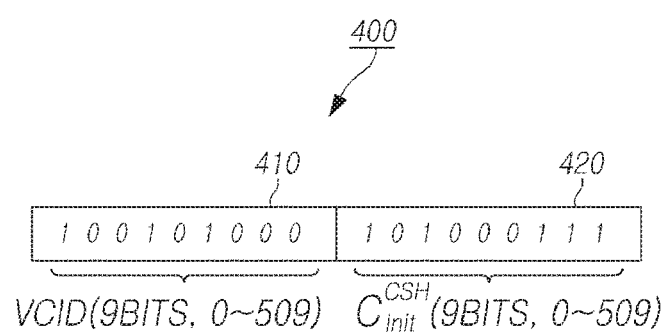
FIG. 4 illustrates a structure of a parameter set configured according to an exemplary embodiment of the present invention.

FIG. 4 illustrates a structure of a parameter set configured according to an exemplary embodiment of the present invention.

The parameter set illustrated in FIG. 4 corresponds to an example of a parameter set configured according to VCID parameter configuration scheme 3 and cyclic shift hopping initial value parameter $C_{init}^{CSH}$ configuration scheme 4.

The parameter set 400 includes a VCID parameter field 410 and a cyclic shift hopping initial value parameter $C_{init}^{CSH}$ field 420. In each of the VCID parameter field 410 and the cyclic shift hopping initial value parameter $C_{init}^{CSH}$ field 420, 9-bit information expressing one integer value among a total of 510 integer values is filled.

Here, each of the VCID parameter and the $C_{init}^{CSH}$ parameter has an integer value, which can be expressed by 9 bits wherein only 510 integer values among 512 integer values from 0 to 511 expressed by 9 bits may be selectively used as the integer value. For example, the $C_{init}^{CSH}$ parameter may have an integer value among 510 integer values from 0 to 509.

Figure 5:
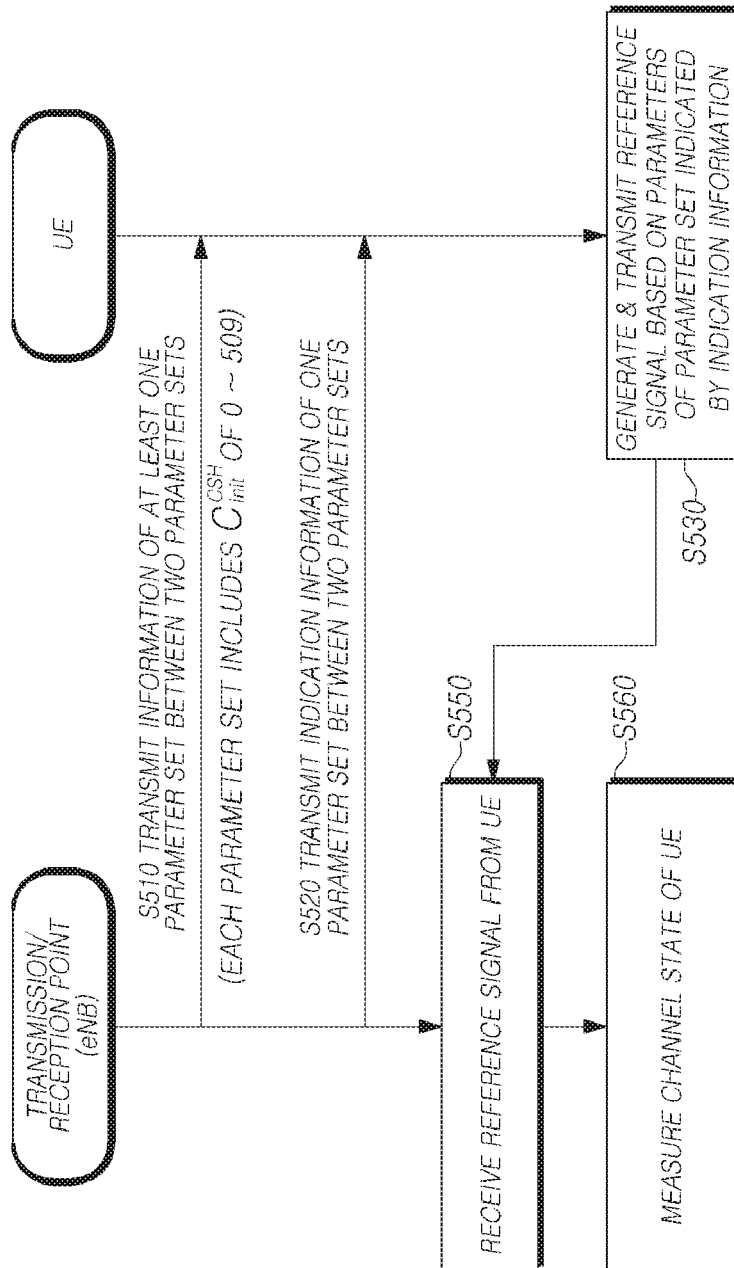
FIG. 5 is a signal flow diagram of a method for transmitting and receiving a reference signal according to an exemplary embodiment of the present invention.

FIG. 5 is a signal flow diagram of a method for transmitting and receiving a reference signal according to an exemplary embodiment of the present invention.

The signal flow diagram illustrated in FIG. 5 shows both a UE, which generates and transmits a DM-RS to a transmission/reception point, and the transmission/reception point, which receives the DM-RS and then estimates a channel state of the UE from the received DM-RS.

First, a method of transmitting a reference signal by a UE may include: receiving information of at least one parameter set between two parameter sets for two types of reference signals from a transmission/reception point (S510); dynamically receiving indication information that indicates a parameter set to be used for generation of a reference signal between the two parameter sets (S520); and generating and transmitting a reference signal by the parameter set indicated by the indication information (S530), wherein each of the parameter sets includes a Virtual Cell Identifier (VCID) parameter and a cyclic shift hopping initial value parameter $C_{init}^{CSH}$, the cyclic shift hopping initial value parameter $C_{init}^{CSH}$ is configured by one integer value among values from 0 to 509 expressed by a total of 9 bits, and the UE calculates an actual cyclic shift hopping initial value $C_{init}$ by a predetermined equation using the received cyclic shift hopping initial value parameter $C_{init}^{CSH}$ and generates the reference signal based on the calculated actual cyclic shift hopping initial value.

Hereinafter, each operation will be described in more detail.

In operation S510, the UE receives a first parameter set and/or a second parameter set, each of which includes a Virtual Cell Identifier (VCID) parameter and a cyclic shift hopping initial value parameter $C_{init}^{CSH}$ having one integer value among values from 0 to 509 expressed by a total of 9 bits. Further, in the case of VCID parameter configuration scheme 3, the Virtual Cell Identifier (VCID) parameter included in each parameter set may also have one integer value among values from 0 to 509 expressed by a total of 9 bits (of course, in the case of VCID parameter configuration scheme 1 or 2, the Virtual Cell Identifier (VCID) parameter may have an integer value among values from 0 to 503 (configuration scheme 1) or among values from 0 to 511 (configuration scheme 2) expressed by a total of 9 bits).

In this event, information of each parameter set may be transmitted through both the first parameter set and the second parameter set. However, parameters having the same values as those in the existing communication scheme (for example, LTE Rel-10) may not be transmitted. That is, one of the two parameter sets may not be signaled.

The signaling of the parameter set information in operation S510 may be performed through higher layer signaling, but aspects of the present invention are not limited thereto.

In operation S520, the indication information indicates one parameter set, parameters of which are to be used for generation of a UL DM-RS sequence, between parameter sets A and B, and may be either explicitly indicated through an additional 1 bit or implicitly indicated, wherein the indication information may be either included in or derived from DCI of a PDCCH, but aspects of the present invention are not limited thereto.

In operation S530, the UE calculates an actual cyclic shift hopping initial value $C_{init}$ by Equation (9) below using the cyclic shift hopping initial value parameter $C_{init}^{CSH}$ (having one integer value among values from 0 to 509) included in the parameter set indicated by the indication information, and generates the reference signal based on the calculated actual cyclic shift hopping initial value.

$$C_{init} = \lfloor C_{init}^{CSH}/30 \rfloor \cdot 2^5 + (C_{init}^{CSH} \bmod 30) \quad \text{Equation (9)}$$

In the process of generating the reference signal in operation S530, which will be described in more detail, the UE calculates a sequence-group number value (u) and a base sequence number value (v) within the sequence-group number by Equations (2) and (3) by using the Virtual Cell Identifier (VCID) parameter included in the parameter set determined by the indication information, calculates $n_{PN}(n_s)$ by using the actual cyclic shift hopping initial value $C_{init}$ calculated by Equation (9) using the cyclic shift hopping initial value parameter $C_{init}^{CSH}$ included in the parameter set as described above, and generates a final reference signal (DM-RS) sequence according to Equation (1).

Then, the UE maps the generated final reference signal (DM-RS) sequence to Resource Elements (REs) of the corresponding resource block(s), generates SC-FDMA signals including the uplink DM-RS, and then transmits the generated SC-FDMA signals to the transmission/reception point. As illustrated in TS36.211, a Resource Element (RE) may be a base unit of resources in frequency and time domains, and a resource block may include a plurality of REs.

Further, according to aspects of the present invention, a method of receiving a reference signal by a transmission/reception point may include: configuring two parameter sets for two types of reference signals and transmitting information of at least one parameter set between the two parameter sets to the UE (S510); dynamically transmitting indication information that indicates a parameter set to be used for generation of a reference signal between the two parameter sets to the UE (S520); receiving the reference signal, which is generated and transmitted by the UE based on the parameter set indicated by the indication information (S550); and measuring a channel state of the UE by using the received reference signal (S560), wherein each of the parameter sets includes a Virtual Cell Identifier (VCID) parameter and a cyclic shift hopping initial value parameter $C_{init}^{CSH}$, and the cyclic shift hopping initial value parameter $C_{init}^{CSH}$ may be configured by one integer value among values from 0 to 509 expressed by a total of 9 bits. Further, the Virtual Cell Identifier (VCID) parameter included in each parameter set may be configured by one integer value expressed by a total of 9 bits.

The transmissions of a parameter set and indication information by the transmission/reception point in operations S510 and S520 may be performed as described above with respect to the operations S510 and S520 of the UE, thus detailed description thereof is omitted.

In the process of receiving the reference signal and measuring a channel state by using the received reference signal in operations S550 and S560, which will be described in more detail, the transmission/reception point receives SC-FDMA signals including a DM-RS and performs resource elements de-mapping, so as to extract an uplink DM-RS sequence.

Specifically, the transmission/reception point generates the DM-RS sequence based on the parameter set information and the indication information transmitted to the UE in the operations S510 and S520 and compares the generated DM-RS sequence with a DM-RS sequence extracted from the received signal to measure the channel state.

As described above, in an exemplary embodiment of the present invention, a transmission/reception point, which estimates a channel by receiving an uplink reference signal, such as a DM-RS, configures two types of parameter sets according to the communication environment, such as a CoMP scenario, and then transmits the configured parameter sets to the UE, wherein each parameter set includes a Virtual Cell Identifier (VCID) parameter and a cyclic shift hopping initial value parameter $C_{init}^{CSH}$, which is configured by one integer value among values from 0 to 509 expressed by a total of 9 bits. Further, the UE calculates an actual cyclic shift hopping initial value $C_{init}$ by Equation (8) or (9) using the cyclic shift hopping initial value parameter $C_{init}^{CSH}$ included in the parameter set, generates a reference signal based on the calculated value, and then transmits the generated reference signal to the transmission/reception point.

In relation to the types of parameters included in each parameter set and their configuration (the range of the parameter values), aspects of the present invention are not limited to the configuration shown in FIG. 5 and may include at least one of Virtual Cell Identifier (VCID) parameter configuration schemes 1 to 3, $C_{init}^{CSH}$ parameter configuration schemes 1 to 4, and a combination thereof.

Figure 6:
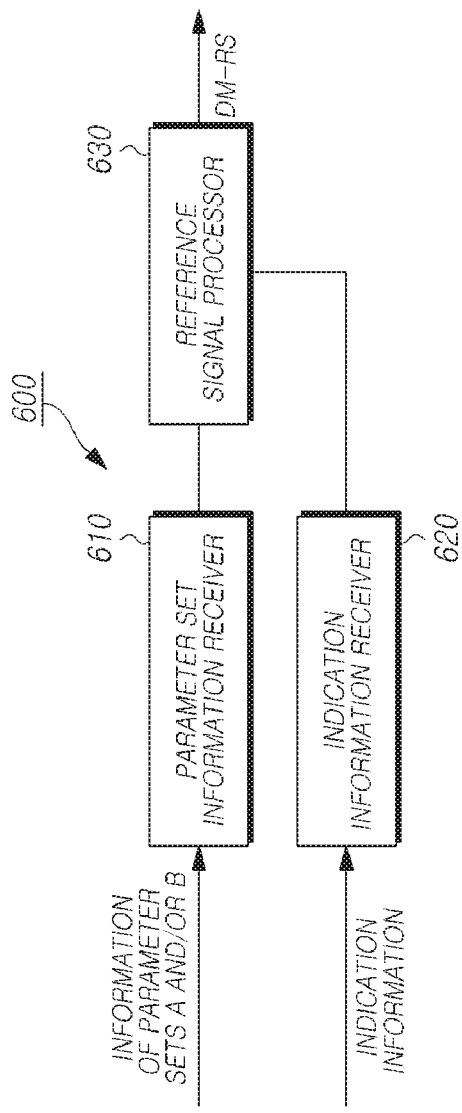
FIG. 6 is a block diagram illustrating a reference signal transmission apparatus according to an exemplary embodiment of the present invention.

FIG. 6 is a block diagram illustrating a reference signal transmission apparatus according to an exemplary embodiment of the present invention.

The reference signal transmission apparatus as described above may be implemented in connection with a UE, may be embedded in the UE, or may be some aspects of the UE. The reference signal transmission apparatus may include software and/or hardware or may utilize software and/or hardware of the UE. In order to perform one or more operations described herein, the reference signal transmission apparatus and/or the UE may include one or more processors, one or more memories, one or more transmitters/receivers, modems, controllers, antennas, Radio Frequency interfaces, Air interfaces, and the like.

A reference signal transmission apparatus 600 may include: a parameter set information receiver 610 to receive information of at least one parameter set between two parameter sets for two types of reference signals from a transmission/reception point; an indication information receiver 620 to dynamically receive indication information that indicates a parameter set to be used for generation of a reference signal between the two parameter sets; and a reference signal processor 630 to generate and transmit a reference signal based on parameters of the parameter set determined by the indication information, wherein each of the parameter sets includes a cyclic shift hopping initial value parameter $C_{init}^{CSH}$ configured by one integer value among values from 0 to 509 expressed by a total of 9 bits.

Each of the parameter sets received by the parameter set information receiver 610 may include a cyclic shift hopping initial value parameter $C_{init}^{CSH}$, which is configured by one integer value among values from 0 to 509 expressed by a total of 9 bits, and a Virtual Cell Identifier (VCID) parameter configured by information of a total of 9 bits.

Further, the information of each parameter set received by the parameter set information receiver 610 may be information of both the first parameter set and/or the second parameter set. However, parameters having the same values as those in the existing communication scheme (for example, LTE Rel-10) may not be signaled, and the signaling of the parameter set information may be performed through higher layer signaling, such as signaling from an RRC.

The indication information received by the indication information receiver 620 may be either additional 1 bit information explicitly included in DCI of a PDCCH or information implicitly derived from DCI of a PDCCH.

Further, the reference signal processor 630 calculates an actual cyclic shift hopping initial value $C_{init}$ by $C_{init}=\lfloor C_{init}^{CSH}/30 \rfloor \cdot 2^5 + (C_{init}^{CSH} \bmod 30)$ based on the cyclic shift hopping initial value parameter $C_{init}^{CSH}$ included in the parameter set determined by the indication information, and generates the reference signal based on the calculated actual cyclic shift hopping initial value, and transmits the generated reference signal.

Specifically, the reference signal processor 630 calculates a sequence-group number value (u) and a base sequence number value (v) within the sequence-group number by Equations (2) and (3) by using the Virtual Cell Identifier (VCID) parameter included in the parameter set determined by the indication information, calculates $n_{PN}(n_s)$ by using the actual cyclic shift hopping initial value $C_{init}$ calculated from the cyclic shift hopping initial value parameter $C_{init}^{CSH}$ included in the determined parameter set, generates a final reference signal (DM-RS) sequence according to Equation (1), maps the generated final reference signal (DM-RS) sequence to Resource Elements (REs) of the corresponding resource block(s), generates SC-FDMA signals including the uplink DM-RS, and then transmits the generated SC-FDMA signals to the transmission/reception point.

Figure 7:
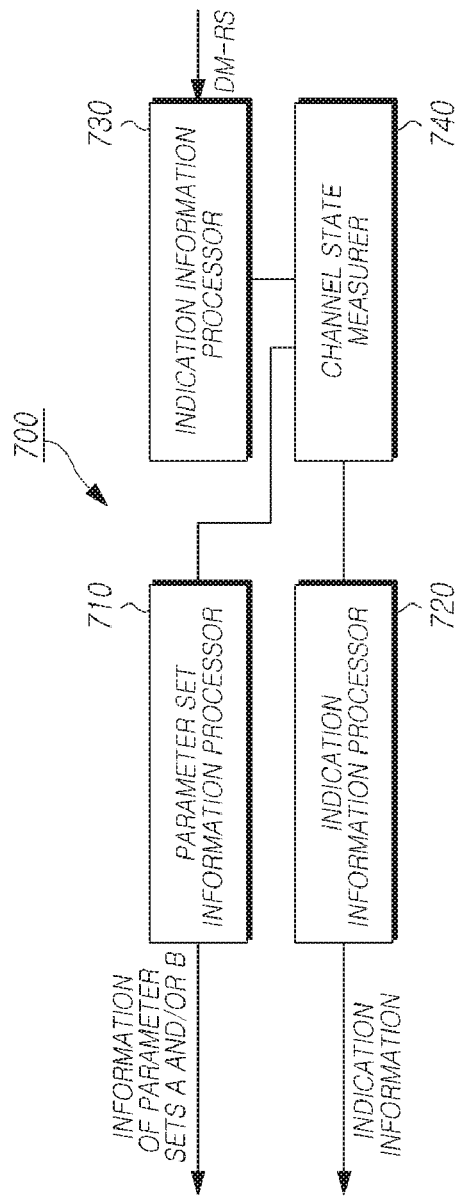
FIG. 7 is a block diagram illustrating a reference signal receiving and channel state measuring apparatus according to an exemplary embodiment of the present invention.

FIG. 7 is a block diagram illustrating a reference signal receiving and channel state measuring apparatus according to an exemplary embodiment of the present invention.

The reference signal receiving and channel state measuring apparatus (hereinafter "reference signal receiving apparatus") may be implemented by a receiving point of an uplink reference signal, such as base station or eNodeB. However, aspects of the present invention are not limited thereto. The reference signal receiving apparatus may include software and/or hardware or may utilize software and/or hardware of the base station (or eNodeB). In order to perform one or more operations described herein, the reference signal receiving apparatus and/or the base station may include one or more processors, one or more memories, one or more transmitters/receivers, modems, controllers, antennas, Radio Frequency interfaces, Air interfaces, and the like.

A reference signal receiving apparatus 700 may include: a parameter set information processor 710 to configure or determine two parameter sets for switching of reference signals (DM-RSs) and to transmit information of at least one parameter set between the two parameter sets to the UE; an indication information processor 720 to generate and transmit indication information that indicates a parameter set to be used for generation of a reference signal between the two parameter sets to the UE; a reference signal receiver 730 to receive a reference signal, which is generated and transmitted by the UE based on the parameter set indicated by the indication information; and a channel state measurer 740 to measure a channel state of the UE by using the received reference signal, wherein each of the parameter sets includes a cyclic shift hopping initial value parameter $C_{init}^{CSH}$ configured by one integer value among values from 0 to 509 expressed by a total of 9 bits.

Further, each of the parameter sets may further include a Virtual Cell Identifier (VCID) parameter configured by information a total of 9 bits.

Further, the information of each parameter set transmitted to the UE by the parameter set information processor 710 may be information of both the first parameter set and/or the second parameter set. However, parameters having the same values as those in the existing communication scheme (for example, LTE Rel-10) may not be signaled, and the signaling of the parameter set information may be performed through higher layer signaling, such as signaling from an RRC.

The indication information transmitted to the UE by the indication information processor 720 may be either additional 1 bit information explicitly included in DCI of a PDCCH or information implicitly derived from DCI of a PDCCH.

Further, the reference signal received from the UE by the reference signal receiver 730 may be a DM-RS, which is a reference signal generated based on an actual cyclic shift hopping initial value $C_{init}$ calculated by $C_{init} = \lfloor C_{init}^{CSH}/30 \rfloor \cdot 2^5 + (C_{init}^{CSH} \bmod 30)$ based on the cyclic shift hopping initial value parameter $C_{init}^{CSH}$ by the UE.

The channel state measurer 740 receives SC-FDMA signals including the DM-RS transmitted by the UE and performs resource elements de-mapping of the received signal to extract an uplink DM-RS sequence. Then, the channel state measurer 740 generates an an actual cyclic shift hopping initial value $C_{init}$ from the cyclic shift hopping initial value parameter $C_{init}^{CSH}$ signaled to the UE and a reference DM-RS sequence from the Virtual Cell Identifier (VCID) parameter, and compares the extracted uplink DM-RS sequence with the reference DM-RS sequence, so as to measure the channel state.

By configuring a parameter set including a cyclic shift hopping initial value parameter $C_{init}^{CSH}$ and a Virtual Cell Identifier (VCID) parameter according to the configuration scheme as described above and transmitting and receiving a reference signal (DM-RS) by using the configured parameter set, it may be possible to achieve uplink reference signal switching with an optimum quantity of information.

In more detail, by configuring a Virtual Cell Identifier (VCID) parameter and a parameter set including a cyclic shift hopping initial value parameter $C_{init}^{CSH}$ having an integer value among values from 0 to 509 expressed by a total of 9 bits, dynamic transmission or reception of a reference signal and channel estimation through the dynamic transmission or reception of the reference signal may be performed even when the communication environment dynamically changes as in a CoMP scenario.

Even in the case where all elements configuring an embodiment of the present invention are combined into a single element or operate as a single combined element in the above description, aspects of the present invention are not limited to such an embodiment. That is, within the spirit or scope of the present invention, at least one element or all elements may be selectively combined for operation.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of transmitting a reference signal by a User Equipment (UE), the method comprising:
   receiving an initial value;
   determining a base sequence of a reference signal sequence based on a cell identifier;
   initializing a pseudo-random sequence generator with a sequence initialization value;
   determining a cyclic shift value of the reference signal sequence based on a pseudo-random sequence generated by the pseudo-random sequence generator; and
   transmitting the reference signal based on the cyclic shift value and the base sequence,
   wherein the sequence initialization value is generated based on below equation:

$$V_1 = \left\lfloor \frac{V_2}{30} \right\rfloor \cdot 2^5 + (V_2 \bmod 30),$$

and
   in the equation, $V_1$ is the sequence initialization value, $V_2$ is the initial value, and ($V_2 \bmod 30$) denotes a modulo 30 operation on $V_2$.

2. The method of claim 1, wherein the initial value is received through a higher layer signaling.

3. The method of claim 2, wherein the initial value is configured based on one of integer values in a range of 0 to 509.

4. The method of claim 2, further comprising receiving the cell identifier through the higher layer signaling.

5. The method of claim 4, wherein the cell identifier is a virtual cell identifier which is configured based on one of integer values in a range of 0to 509.

6. The method of claim 2, wherein the cell identifier is a cell identifier which is configured based on one of integer values in a range of 0 to 503.

7. A method of receiving a reference signal by a transmission/reception point, the method comprising:
   transmitting an initial value to a User Equipment (UE); and
   receiving a reference signal from the UE, wherein:
the reference signal is generated based on a cyclic shift value and a base sequence;
the base sequence is determined based on a cell identifier;
the cyclic shift value is determined based on a pseudo-random sequence generated by a pseudo-random sequence generator;
the pseudo random sequence generator is initialized with a sequence initialization value;
the sequence initialization value is generated based on below equation:

$$V_1 = \left\lfloor \frac{V_2}{30} \right\rfloor \cdot 2^5 + (V_2 \bmod 30);$$

and
in the equation, $V_1$ is the sequence initialization value, $V_2$ is the initial value, and ($V_2 \bmod 30$) denotes a modulo 30 operation on $V_2$.

8. The method of claim 7, wherein the initial value is transmitted through a higher layer signaling.

9. The method of claim 8, wherein the initial value is configured based on one of integer values in a range of 0 to 509.

10. The method of claim 8, further comprising transmitting the cell identifier through the higher layer signaling.

11. The method of claim 10, wherein the cell identifier is a virtual cell identifier which is configured based on one of integer values in a range of 0 to 509.

12. The method of claim 8, wherein the cell identifier is a cell identifier which is configured based on one of integer values in a range of 0 to 503.

13. An apparatus to transmit a reference signal, the apparatus comprising:
a receiver that receives an initial value;
a reference signal processor that determines a base sequence of a reference signal sequence based on a cell identifier, initializes a pseudo-random sequence generator with a sequence initialization value, determines a cyclic shift value of the reference signal sequence based on a pseudo-random sequence generated by the pseudo-random sequence generator; and
a transmitter that transmits the reference signal based on the cyclic shift value and the base sequence,
wherein the sequence initialization value is generated based on below equation:

$$V_1 = \left\lfloor \frac{V_2}{30} \right\rfloor \cdot 2^5 + (V_2 \bmod 30),$$

and
in the equation, $V_1$ is the sequence initialization value, $V_2$ is the initial value, and ($V_2 \bmod 30$) denotes a modulo 30 operation on $V_2$.

14. The apparatus of claim 13, wherein the receiver receives the initial value through a higher layer signaling.

15. The apparatus of claim 14, wherein the initial value is configured based on one of integer values in a range of 0 to 509.

16. The apparatus of claim 14, wherein the receiver further receives the cell identifier through the higher layer signaling.

17. The apparatus of claim 16, wherein the cell identifier is a virtual cell identifier which is configured based on one of integer values in a range of 0 to 509.

18. The apparatus of claim 14, wherein the cell identifier is a cell identifier which is configured based on one of integer values in a range of 0 to 503.

* * * * *